No. 824,615. PATENTED JUNE 26, 1906.
A. BECKER.
FREIGHT CAR.
APPLICATION FILED FEB. 7, 1906.
BEST AVAILABLE COPY
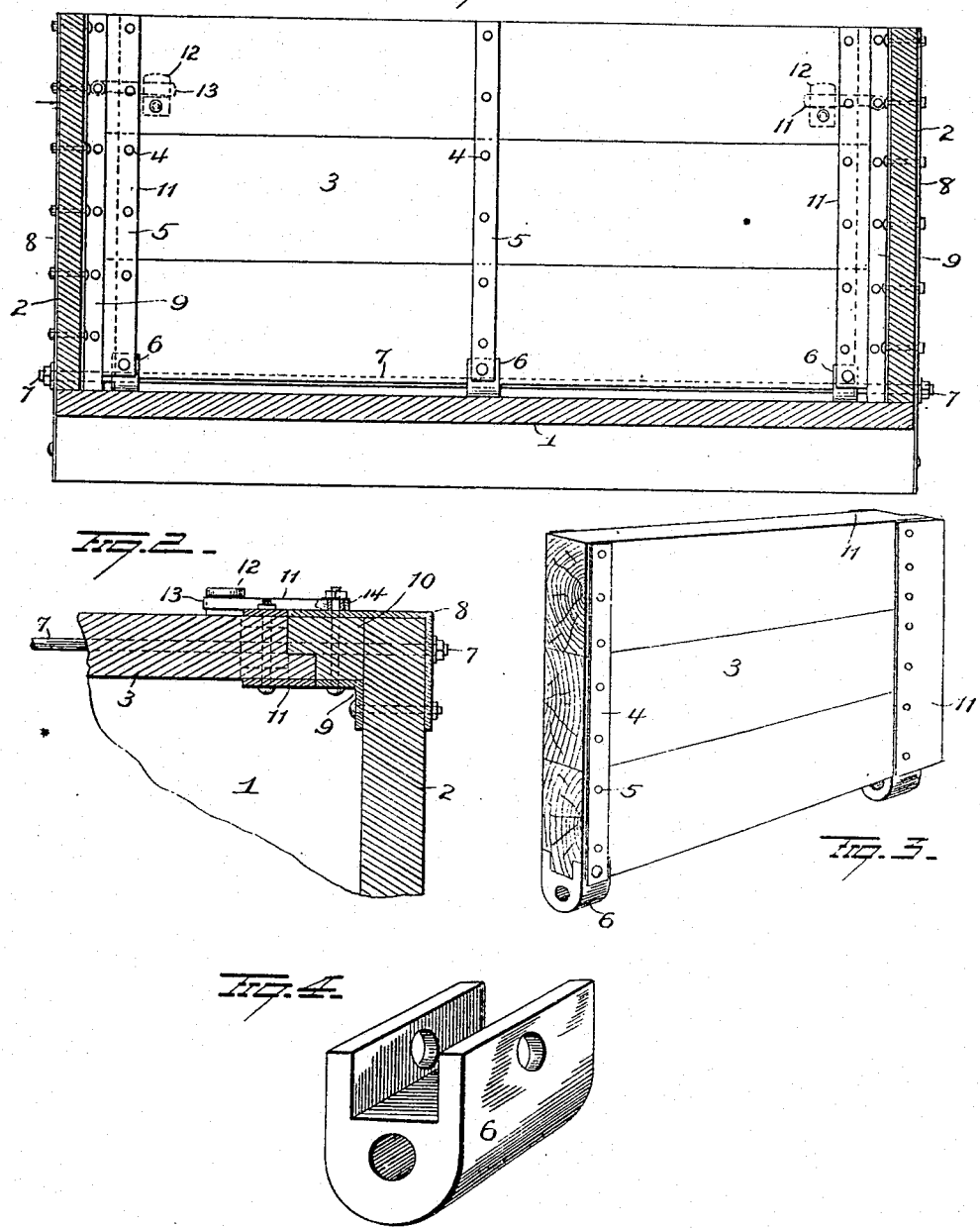

UNITED STATES PATENT OFFICE.

ANTON BECKER, OF COLUMBUS, OHIO.

FREIGHT-CAR.

No. 824,615.  Specification of Letters Patent.  Patented June 26, 1906.

Application filed February 7, 1906. Serial No. 299,990.

*To all whom it may concern:*

Be it known that I, ANTON BECKER, a resident of Columbus, in the county of Franklin and State of Ohio, have invented certain new and useful Improvements in Freight-Cars; and I do hereby declare the following to be a full, clear, and exact description of the invention, such as will enable others skilled in the art to which it appertains to make and use the same.

My invention relates to improvements in freight-cars, the object of the invention being to provide an improved construction of end-gates and mounting therefor and improved mechanism for securely holding the gates in vertical position; and the invention consists in certain novel features of construction and combinations and arrangements of parts, as will be more fully hereinafter described, and pointed out in the claims.

In the accompanying drawings, Figure 1 is a view in vertical section illustrating my improvements. Fig. 2 is a view in cross-section. Fig. 3 is a fragmentary perspective view of one end-gate, and Fig. 4 is an enlarged detail view of hinge-casting to be secured to the gate.

1 represents a car-bottom; 2, the sides secured thereto, and 3 my improved end-gate. The construction being alike at both ends of the car, a detail description of one end will apply alike to both.

The gate 3 comprises a series of horizontal timbers, secured together by metal straps 4, secured in place by bolts 5, and castings 6 are secured to the lower edge of the gate, as shown. These castings are made with alined openings to receive a cross-rod 7, secured to the car, and the castings 6 are rounded at their lower ends to permit them to turn freely and allow the gate to be swung down to a horizontal position flat on the car-bottom or up to a vertical position to close the end of the car. The castings 6 are bifurcated at their upper portions to receive the gate and bolts are passed through said bifurcated portions of the castings and through the gate to secure the castings thereto.

Angle-irons 8 are securely bolted to the outer corners of the sides, and smaller angle-irons 9 are securely bolted to the inner face of the sides near their ends, and a timber or furring 10 is secured between said angle-irons and is made of stepped form, the angle-irons 8 and 9 extending to the edge of the timber or furring 10 to protect the same. The side edges of gate 3 are also made of stepped form to fit the timber or furring 10 and limit the outward movement of the gate, and reinforcing-strips 11 are secured to the opposite sides of the gate at its side edges to protect the latter.

A hook 12 is secured to the outer face of the gate 3, and a pawl 13 is supported on a bushing 14, located on one of the furring-securing bolts 15, and is adapted to enter the hook 12 and secure the gate in its upright position. While I have illustrated but one pawl and hook, it is obvious that a pawl and hook may be provided at both sides of the gate, if desired.

By this construction and arrangement of parts it will be observed that the gate 3 may be swung down flat on the car-bottom to permit the use of the car as an ordinary flat-car, or can be swung to a vertical position to form a box.

My improvements are simple and inexpensive to manufacture, are strong and durable in use, and are a great improvement in the art.

Slight changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a car-bottom and sides, and a rod passing through the sides in proximity to the bottom near an end of the car, of an end-gate, and castings secured to the bottom of the end-gate and provided with openings for the passage of said rod.

2. The combination with a car-bottom and sides, of a rod passing through the sides near an end of the car, an end-gate, and castings bifurcated to receive an edge of the gate and secured thereto and having openings for the passage of said rod.

3. The combination with a car-bottom, and sides and an end-gate, of castings bifurcated to receive the lower edge of the end-gate and depending from the same and a rod passing through the sides of the car and said castings.

4. The combination with a car-bottom and sides, and an end-gate, of castings bifurcated to receive the lower edge of the end-gate, each casting having an opening therethrough and a curved lower face, and a rod passing through the sides of the car and through the openings in the castings.

5. The combination with a car-bottom and sides thereon, of gates hinged at their lower edges between the sides, angle-irons secured to the sides, timbers or furrings secured between the angle-irons, said timbers or furrings and the gate edges constructed to fit each other, and reinforcing-strips at opposite sides of the gate at its side edges.

6. The combination with a car-bottom and sides thereon, of hinged gates at the ends of the bottom, angle-irons secured to opposite sides of the sides at their ends, timbers or furrings secured between the angle-irons and shaped to fit the edges of the gates, hooks carried by the gates, and pivoted locking-pawls carried by the angle-irons to enter the hooks and secure the gates in upright position.

In testimony whereof I have signed this specification in the presence of two subscribing witnesses.

A. BECKER.

Witnesses:
E. I. NOTTINGHAM,
J. S. RALSTON.